United States Patent
Shimizu et al.

(10) Patent No.: US 10,587,448 B2
(45) Date of Patent: Mar. 10, 2020

(54) TRANSMISSION DEVICE, RECEPTION DEVICE, AND TRANSMISSION METHOD

(71) Applicants: Kabushiki Kaisha Toshiba, Tokyo (JP); Toshiba Infrastructure Systems & Solutions Corporation, Kanagawa (JP)

(72) Inventors: Itsuhei Shimizu, Tokyo (JP); Makoto Tanahashi, Tokyo (JP); Noboru Taga, Kanagawa (JP); Hideki Oono, Kanagawa (JP); Kenichi Matsushita, Kanagawa (JP)

(73) Assignees: Kabushiki Kaisha Toshiba, Tokyo (JP); Toshiba Infrastructure Systems & Solutions Corporation, Kanagawa (JP)

( * ) Notice: Subject to any disclaimer, the term of this patent is extended or adjusted under 35 U.S.C. 154(b) by 167 days.

(21) Appl. No.: 15/839,373

(22) Filed: Dec. 12, 2017

(65) Prior Publication Data

US 2018/0183648 A1   Jun. 28, 2018

(30) Foreign Application Priority Data

Dec. 22, 2016 (JP) .................................. 2016-249604

(51) Int. Cl.
*H04L 27/34* (2006.01)
*G06F 17/14* (2006.01)
(Continued)

(52) U.S. Cl.
CPC ........ *H04L 27/3411* (2013.01); *G06F 17/142* (2013.01); *H04J 11/0059* (2013.01);
(Continued)

(58) Field of Classification Search
CPC ............. H04L 27/3411; H04L 27/2621; H04L 27/2646; H04L 27/2675; H04L 27/3872;
(Continued)

(56) References Cited

U.S. PATENT DOCUMENTS

| 6,125,103 | A  | * | 9/2000 | Bauml | H04L 27/2602 370/203 |
| 8,374,074 | B2 | * | 2/2013 | Liao  | H04L 27/2621 370/208 |
| 2003/0202460 | A1 | * | 10/2003 | Jung | H04L 27/2621 370/208 |
| 2004/0257979 | A1 | * | 12/2004 | Ro | H04L 27/2613 370/208 |

(Continued)

FOREIGN PATENT DOCUMENTS

| JP | 2016-082283 A | 5/2016 |
| JP | 2016-205174 A | 12/2016 |

*Primary Examiner* — Wutchung Chu
(74) *Attorney, Agent, or Firm* — Baker Botts L.L.P.

(57) ABSTRACT

According to one embodiment, a transmission device includes an insertion unit, an allocation unit, a division unit, an IFFT unit, a phase rotation unit, and a transmission unit. The phase rotation unit performs a phase rotation to reduce a PAPR characteristic for each block on which inverse fast Fourier transform has been performed. The transmission unit combines transmission signals, on each of which a phase rotation has been performed by the phase rotation unit, and transmits the combined transmission signal to an external device. In addition, the division unit includes a predetermined band and at least one pilot symbol located outside another of end of this predetermined band on an opposite side of the one end into one block.

4 Claims, 6 Drawing Sheets

(51) Int. Cl.
  *H04J 11/00* (2006.01)
  *H04L 27/26* (2006.01)
  *H04L 27/38* (2006.01)
  *H04L 5/00* (2006.01)
  *H04L 27/00* (2006.01)

(52) U.S. Cl.
  CPC .......... *H04L 5/0044* (2013.01); *H04L 5/0048* (2013.01); *H04L 27/2621* (2013.01); *H04L 27/2646* (2013.01); *H04L 27/2675* (2013.01); *H04L 27/3872* (2013.01); *H04J 2011/0009* (2013.01); *H04L 2027/0087* (2013.01)

(58) Field of Classification Search
  CPC ................ H04L 5/0044; H04L 5/0048; H04L 2027/0087; G06F 17/142; H04J 11/0059; H04J 2011/0009
  See application file for complete search history.

(56) References Cited

U.S. PATENT DOCUMENTS

| | | | |
|---|---|---|---|
| 2005/0111576 A1* | 5/2005 | Anvari | H04L 27/2614 375/297 |
| 2005/0270968 A1* | 12/2005 | Feng | H04L 27/2621 370/208 |
| 2006/0078066 A1* | 4/2006 | Yun | H04B 7/068 375/299 |
| 2007/0217329 A1* | 9/2007 | Abedi | H04L 27/2614 370/208 |
| 2008/0075191 A1* | 3/2008 | Haartsen | H04L 27/2614 375/285 |
| 2014/0016452 A1* | 1/2014 | Hasegawa | H04L 27/2621 370/210 |
| 2015/0195067 A1* | 7/2015 | Kim | H04L 1/0045 370/329 |
| 2015/0304146 A1* | 10/2015 | Yang | H04L 5/0066 370/329 |
| 2016/0305355 A1 | 10/2016 | Takizawa et al. | |
| 2017/0126456 A1* | 5/2017 | Lee | H04L 1/0072 |
| 2018/0091836 A1* | 3/2018 | Lee | H04N 21/235 |
| 2019/0173709 A1* | 6/2019 | Baek | H04J 11/0023 |

* cited by examiner $\theta 1 = \{0, \pi\}$
$\theta 2 = \{0, \pi/2, \pi, 3/2\pi\}$
$\theta 3 = \{0, \pi\}$

TRANSMISSION DEVICE, RECEPTION DEVICE, AND TRANSMISSION METHOD

CROSS-REFERENCE TO RELATED APPLICATION

This application is based upon and claims the benefit of priority from Japanese Patent Application No. 2016-249604, filed Dec. 22, 2016, the entire contents of which are incorporated herein by reference.

FIELD

Embodiments described herein relate generally to a transmission device, a reception device, and a transmission method.

BACKGROUND

It is known that an orthogonal frequency division multiplexing (OFDM) scheme has a very high peak-to-average power ratio (PAPR) of a transmission signal. Since transmission signals with a high PAPR cause distortion due to power amplifiers, reducing the PAPR is an important research topic and numerous PAPR reduction methods have been devised. Among them, a partial transmit sequence (PTS) has a feature of not causing distortion of the transmission signal and thus, it is regarded as a favorable PAPR reduction method. Here, the PTS is a method of dividing an OFDM subcarrier into a plurality of blocks and performing a phase rotation on transmission signals corresponding to the respective blocks to reduce the PAPR.

Incidentally, a transmission device that transmits a transmission signal on which the PTS has been performed needs to notify a reception device that receives this transmission signal of a phase rotation amount which is the amount of a phase rotation performed on the transmission signal. However, if the environment of a channel conveying the transmission signal between the transmission device and the reception device is poor, the transmission device is not able to notify the reception device of the phase rotation amount in some cases. In this case, it becomes difficult for the reception device to demodulate the received transmission signal.

DETAILED DESCRIPTION

In general, according to one embodiment, a transmission device includes an insertion unit, an allocation unit, a division unit, an IFFT unit, a phase rotation unit, and a transmission unit. The insertion unit inserts a pilot symbol into a frequency band of a subcarrier of OFDM at intervals set in advance. The allocation unit allocates, within a frequency band of the subcarrier, a predetermined band which is a part of this frequency band, modulated in accordance with a transmission signal to be transmitted to an external device set in advance, and has a pilot symbol at one end. The division unit divides the frequency band of the subcarrier into a plurality of blocks. The IFFT unit performs inverse fast Fourier transform on each of the blocks. The phase rotation unit performs a phase rotation to reduce a PAPR characteristic for each block on which the inverse fast Fourier transform has been performed. The transmission unit combines the transmission signals, on each of which the phase rotation has been performed by the phase rotation unit, and transmits the combined transmission signal to the external device. In addition, the division unit includes the predetermined band and at least one pilot symbol located outside of another end of this predetermined band on an opposite side of the one end into one block.

Hereinafter, a transmission device, a reception device, and a transmission method according to the present embodiment will be described with reference to the accompanying drawings.

Figure 1:
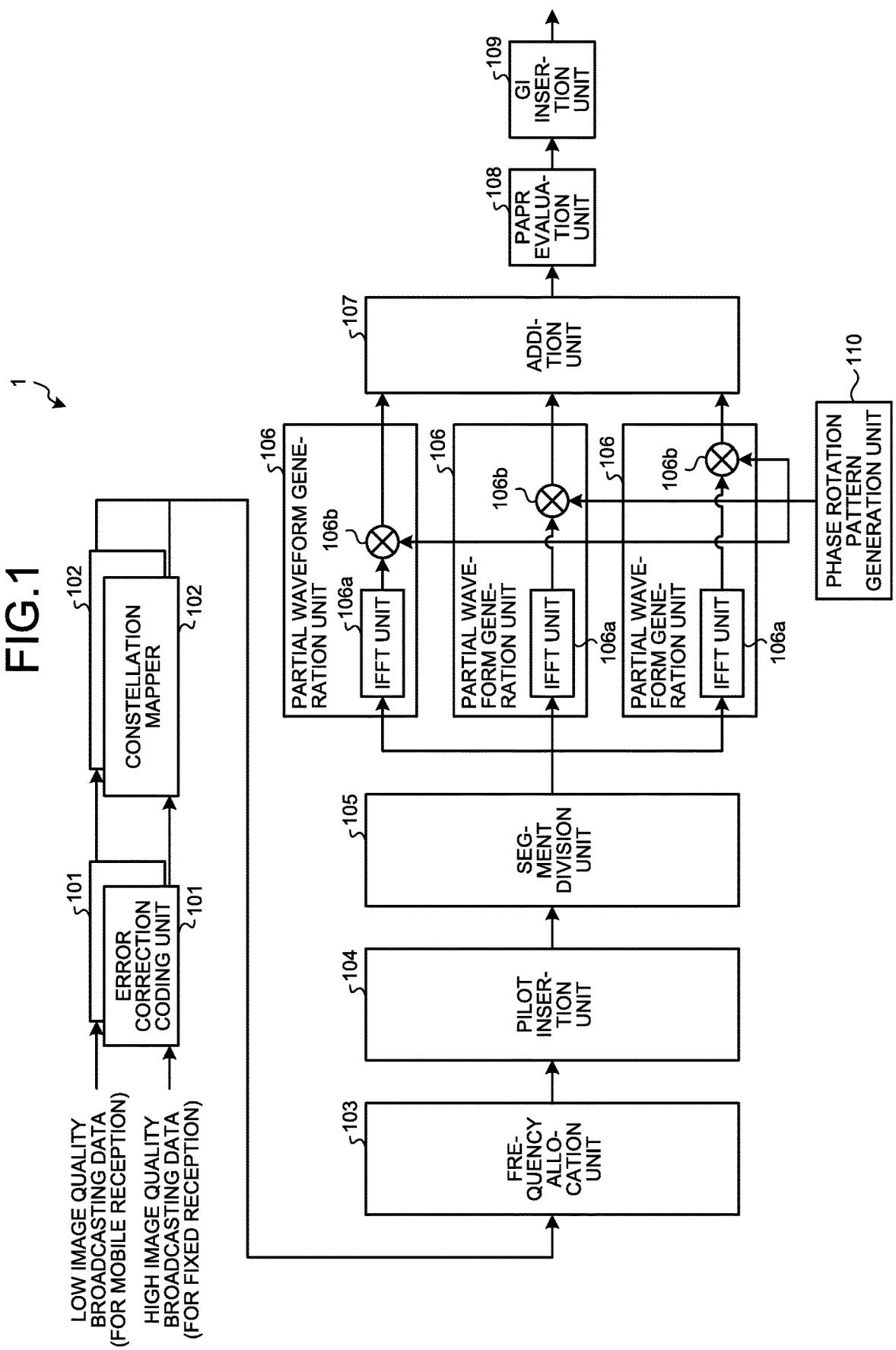
FIG. 1 is a diagram illustrating an example of the configuration of a transmission device according to the present embodiment.

FIG. 1 is a diagram illustrating an example of the configuration of the transmission device according to the present embodiment. As illustrated in FIG. 1, a transmission device 1 according to the present embodiment includes an error correction coding unit 101, a constellation mapper 102, a frequency allocation unit 103, a pilot insertion unit 104, a segment division unit 105, partial waveform generation units 106, an addition unit 107, a PAPR evaluation unit 108, a GI insertion unit 109, and a phase rotation pattern generation unit 110.

The error correction coding unit 101 detects an error in a transmission signal to be transmitted to an external device if the error has occurred, and executes error detection and correction processing to correct the detected error. In the present embodiment, low image quality broadcasting data and high image quality broadcasting data are input to the error correction coding unit 101 as the transmission signal to be transmitted to the external device and the error detection and correction processing is executed on each data. Here, the low image quality broadcasting data is data for mobile reception that is to be transmitted to a mobile object (an example of the external device set in advance and, in the present embodiment, corresponding to a reception device 2 described later) among the external devices to which the transmission device 1 transmits data. The high image quality broadcasting data is data for fixed reception that is to be transmitted to a fixed device among the external devices to which the transmission device 1 transmits data.

The constellation mapper 102 determines a constellation of pilot symbols (for example, scattered pilots SP) to be allocated in the frequency band of the subcarrier of the orthogonal frequency division multiplexing (OFDM) at a cycle set in advance.

Figure 2:
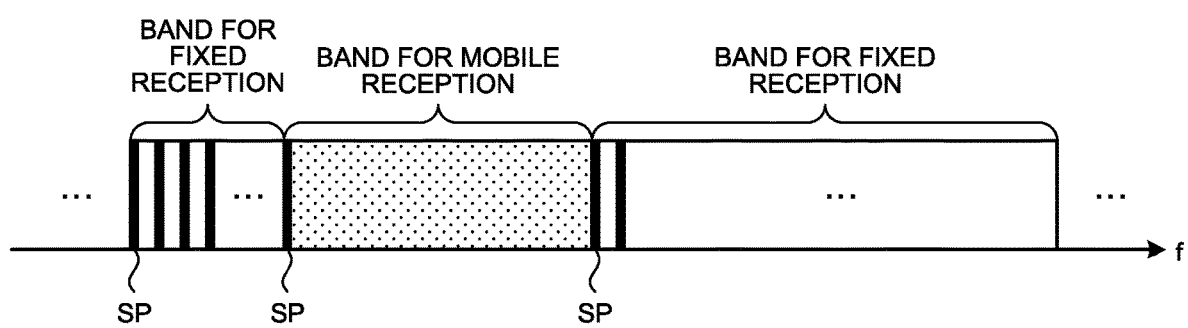
FIG. 2 is a diagram illustrating an example of frequency band allocation processing used for transmission of a transmission signal by the transmission device according to the present embodiment.

The frequency allocation unit 103 determines a frequency band used for transmission of the transmission signal in the frequency band of the OFDM subcarrier. FIG. 2 is a diagram illustrating an example of frequency band allocation processing used for transmission of the transmission signal by the transmission device according to the present embodiment. As illustrated in FIG. 2, the frequency allocation unit 103 allocates, in the frequency band of the OFDM subcarrier, a band for mobile reception (an example of the predetermined band) which is a part of this frequency band, modulated in accordance with the low image quality broadcasting data, and has the scattered pilot SP inserted by the pilot insertion unit 104 described later at one end. In addition, as illustrated in FIG. 2, the frequency allocation unit 103 sets a band other than the band for mobile reception in the frequency band of the OFDM subcarrier, which is modulated in accordance with the high image quality broadcasting data, as a band for fixed reception.

As illustrated in FIG. 2, the pilot insertion unit 104 inserts the scattered pilot SP (an example of the pilot symbol) into the frequency band of the OFDM subcarrier at intervals set in advance. The segment division unit 105 divides the frequency band of the subcarrier into a plurality of blocks (hereinafter referred to as PTS blocks). Here, the PTS block is a block in which the same phase rotation is performed by the partial waveform generation unit 106 (described later) out of the frequency band of the subcarrier.

Figure 3:
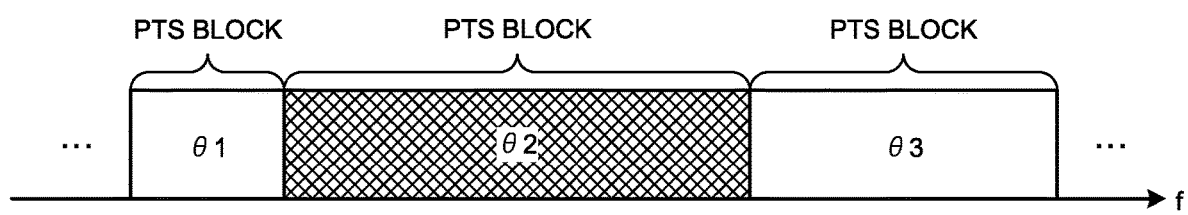
FIG. 3 is a diagram illustrating an example of dividing the frequency of a subcarrier into PTS blocks by the transmission device according to the present embodiment.

FIG. 3 is a diagram illustrating an example of dividing the frequency of the subcarrier into the PTS blocks by the transmission device according to the present embodiment. In the present embodiment, as illustrated in FIG. 3, the segment division unit 105 divides the frequency band of the subcarrier into the plurality of PTS blocks including a PTS block to which the phase rotation is applied by a phase rotation amount θ1, a PTS block to which the phase rotation is applied by a phase rotation amount θ2, and a PTS block to which the phase rotation is applied by a phase rotation amount θ3. At that time, as illustrated in FIGS. 2 and 3, the segment division unit 105 includes, into one PTS block, the band for mobile reception and at least one scattered pilot SP located outside of another end of this band for mobile reception on the opposite side of the one end (that is, an end into which the scattered pilot SP is inserted).

Each of the partial waveform generation units 106 includes an IFFT unit 106a and a phase rotation unit 106b. The IFFT unit 106a performs the inverse fast Fourier transform on each PTS block. The phase rotation unit 106b performs a phase rotation (PTS: partial transmit sequence) on the PTS block on which the inverse fast Fourier transform has been performed, to reduce the peak-to-average power ratio (PAPR). In the present embodiment, it is assumed that the phase rotation unit 106b performs a phase rotation that minimizes the PAPR for each PTS block on which the inverse fast Fourier transform has been performed.

Figures 4, 5:
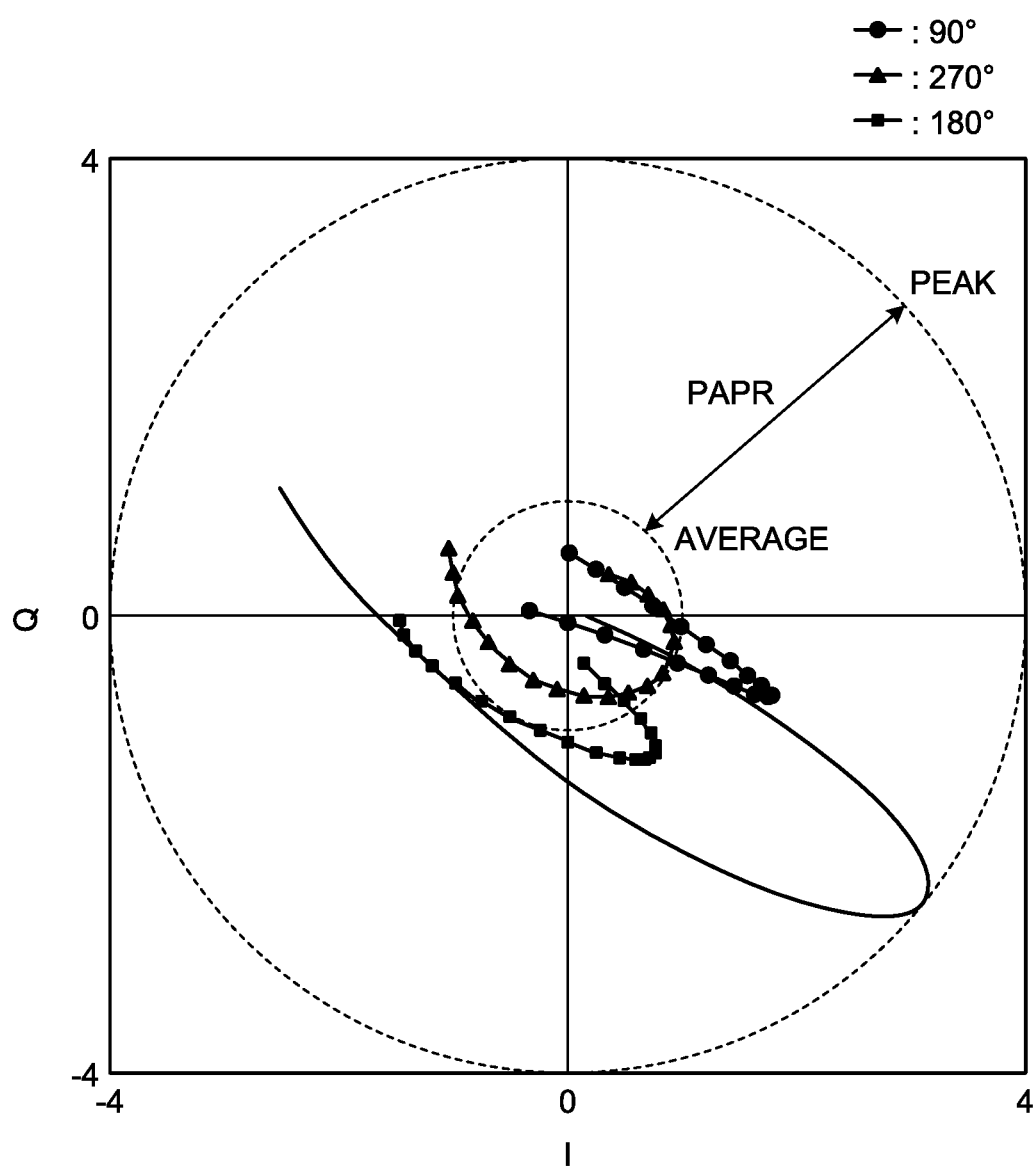
FIG. 4 is a diagram illustrating an example of generating a candidate phase rotation amount by the transmission device according to the present embodiment.
FIG. 5 is a diagram illustrating an example of signal strengths of transmission signals of the respective PTS blocks on which inverse fast Fourier transform has been performed in the transmission device according to the present embodiment.

The phase rotation pattern generation unit 110 generates a candidate phase rotation amount of the phase rotation performed by the phase rotation unit 106b included in each of the partial waveform generation units 106. FIG. 4 is a diagram illustrating an example of generating a candidate phase rotation amount by the transmission device according to the present embodiment. As illustrated in FIG. 4, the phase rotation pattern generation unit 110 sets a greater number of candidates for the phase rotation amount θ2 of the phase rotation performed on a PTS block including the band for mobile reception than candidates for the phase rotation amounts θ1 and θ3 of the phase rotation performed on PTS blocks not including the band for mobile reception.

The addition unit 107 (an example of the transmission unit) combines the transmission signals on which the phase rotation has been performed by the respective phase rotation units 106b, and transmits the combined transmission signal to the external device. The PAPR evaluation unit 108 finds the PAPR of the transmission signal combined by the addition unit 107. The GI insertion unit 109 inserts a guard interval (GI) into the transmission signal combined by the addition unit 107.

Figure 6:
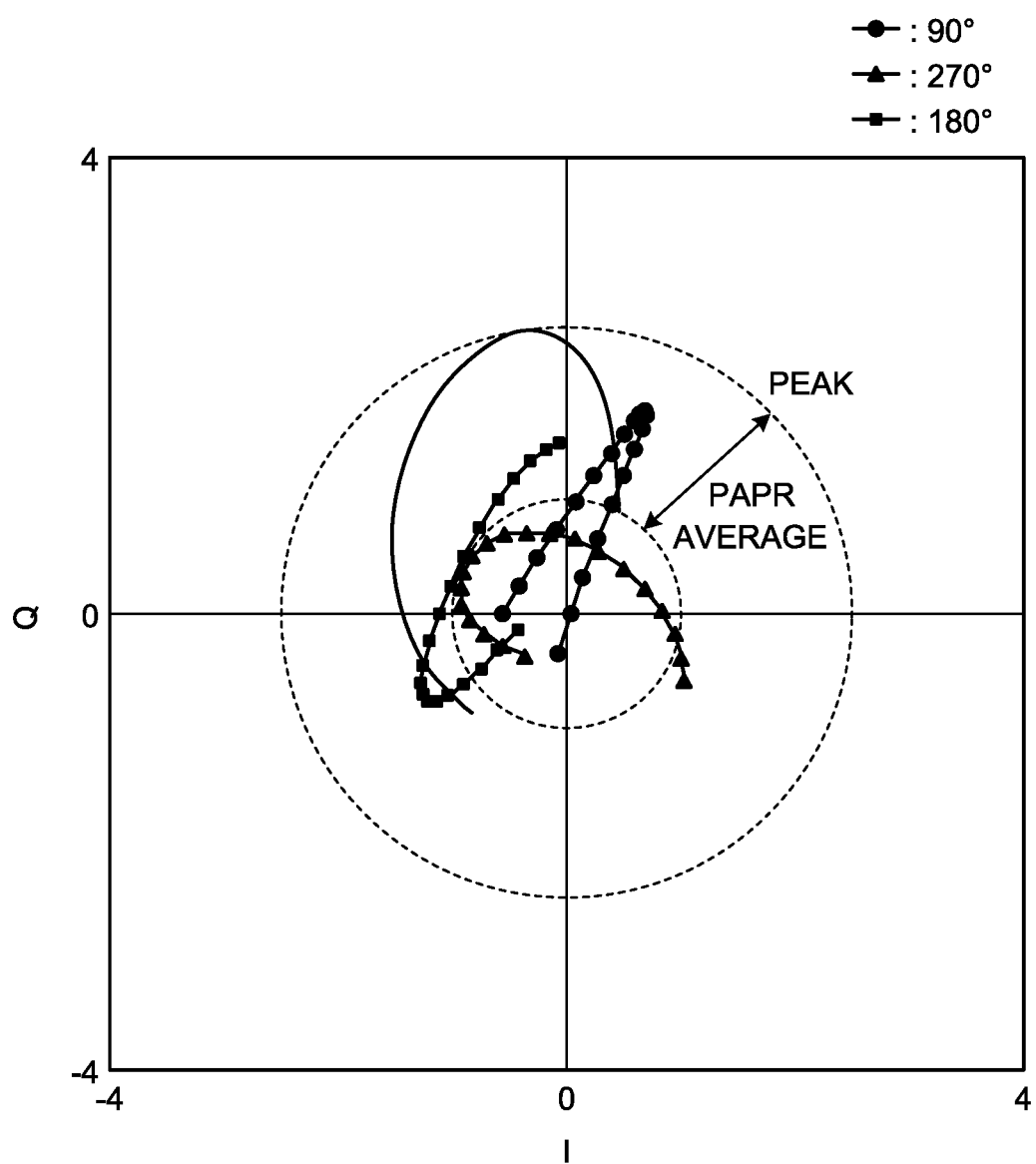
FIG. 6 is a diagram illustrating an example of signal strengths of transmission signals of the respective PTS blocks on which a phase rotation has been performed in the transmission device according to the present embodiment.

FIG. 5 is a diagram illustrating an example of signal strengths of transmission signals of the respective PTS blocks on which the inverse fast Fourier transform has been performed in the transmission device according to the present embodiment. FIG. 6 is a diagram illustrating an example of signal strengths of transmission signals of the respective PTS blocks on which the phase rotation has been performed in the transmission device according to the present embodiment. In each of FIGS. 5 and 6, a vertical axis represents the signal strength of an imaginary component of the transmission signal, whereas a horizontal axis represents the signal strength of a real component of the transmission signal.

In a case where the transmission signals of the three PTS blocks output from the IFFT units 106a are combined without performing the phase rotation, the PAPR of the transmission signals of the three PTS blocks increases as illustrated in FIG. 5. In a case where the transmission signals of the three PTS blocks output from the IFFT units 106a are combined by separately performing different phase rotations (for example, 90°, 270°, and 180°), the PAPR of the transmission signals of the three PTS blocks decreases as illustrated in FIG. 6.

Figure 7:
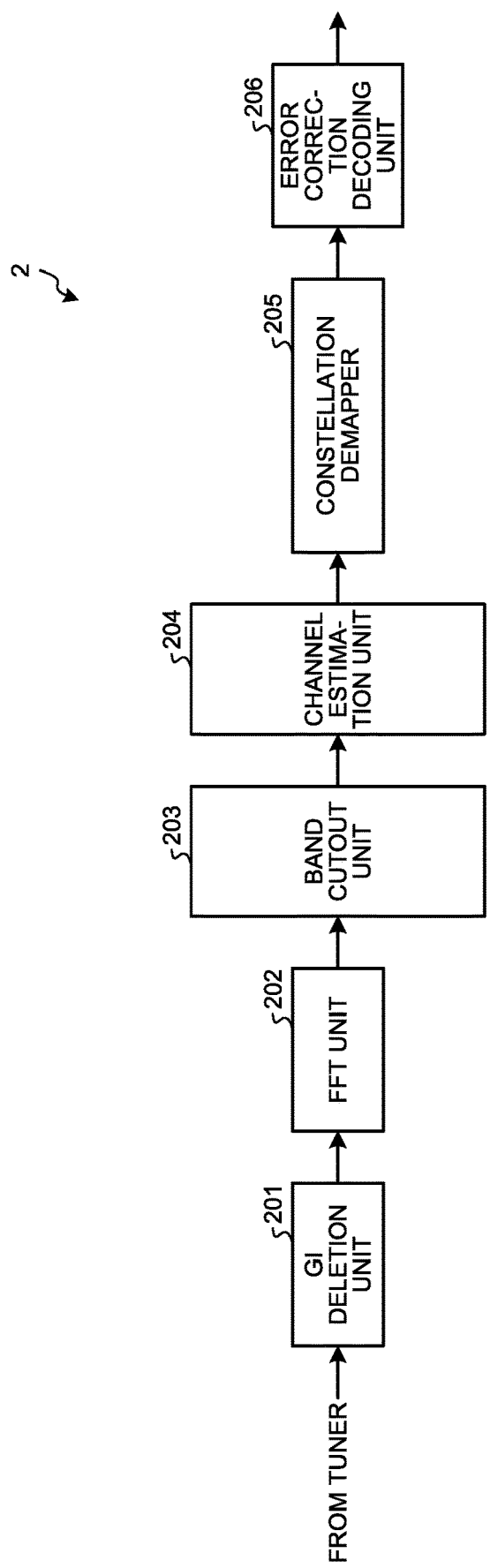
FIG. 7 is a diagram illustrating an example of the configuration of a reception device according to the present embodiment.
Figure 8:
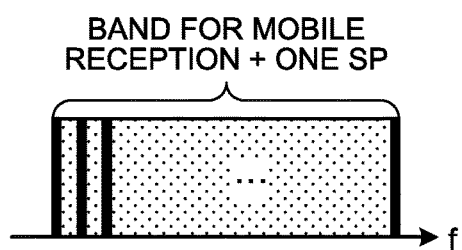
FIG. 8 is a diagram illustrating an example of a band of a transmission signal received by the reception device according to the present embodiment.

Next, an example of the configuration of the reception device 2 according to the present embodiment will be described with reference to FIGS. 7 and 8. FIG. 7 is a diagram illustrating an example of the configuration of the reception device according to the present embodiment. FIG. 8 is a diagram illustrating an example of a band of a transmission signal received by the reception device according to the present embodiment.

As illustrated in FIG. 7, the reception device 2 according to the present embodiment includes a GI deletion unit 201, an FFT unit 202, a band cutout unit 203, a channel estimation unit 204, a constellation demapper 205, and an error correction decoding unit 206. In addition, as illustrated in FIG. 8, the reception device 2 receives, using a tuner (an example of a reception unit) (not illustrated), a transmission signal of a band including the band for mobile reception out of the frequency band of the OFDM subcarrier and at least one scattered pilot SP located outside of the another end of this band for mobile reception on the opposite side of the one end.

The GI deletion unit 201 deletes the GI from the transmission signal received by the tuner (not illustrated). The FFT unit 202 performs fast Fourier transform on the transmission signal from which the GI has been deleted. The band cutout unit 203 cuts out a transmission signal of the band for mobile reception (that is, the low image quality broadcasting data) from the transmission signal on which the fast Fourier transform has been performed. The channel estimation unit 204 (an example of an estimation unit) extracts the scattered pilot SP from the transmission signal on which the fast Fourier transform has been performed and, on the basis of the extracted scattered pilot SP, estimates a channel response for the band for mobile reception.

Here, in a case where an amplitude fluctuation between the transmission device 1 and the reception device 2 is assumed as a(f) and a phase fluctuation between the transmission device 1 and the reception device 2 is assumed as φ(f), the channel response for the band for mobile reception is expressed as $H(f)=a(f) \times e^{\wedge}(j \times \phi(f))$. Then, as described above, the reception device 2 receives a transmission signal of a band including the band for mobile reception out of the frequency band of the OFDM subcarrier and at least one scattered pilot SP located outside of the another end of this band for mobile reception on the opposite side of the one end. Additionally, for the PTS block including the band for mobile reception, the phase rotation of the same phase rotation amount (for example, θ2 illustrated in FIG. 3) has been performed in the transmission device 1. Therefore, when the phase rotation is considered as a part of the phase fluctuation, the channel response for the band for mobile reception can be expressed as $H(f)=a(f) \times e^{\wedge}(j \times (\phi(f)+\theta 2))$.

Accordingly, when the subcarriers on which the scattered pilots SP are allocated are assumed as f_sp 1, f_sp 2, . . . in the band for mobile reception, the channel estimation unit 204 interpolates between respective H(f_sp1), H(f_sp2), . . . , which are the channel responses for the subcarriers, whereby a channel response H(f) for the entire band for mobile reception can be estimated. Here, if the reception device 2 receives only the transmission signal of the band for the mobile reception out of the frequency band of the OFDM subcarrier, the scattered pilot SP located outside of the another end of the band for mobile reception is not obtained. Therefore, the channel estimation unit 204 needs to find a channel response H for the entire band for mobile reception by extrapolation and thus, the estimation accuracy of the channel response is remarkably reduced.

On the other hand, in the present embodiment, since the channel estimation unit 204 can find the channel response for the entire band for mobile reception by interpolation, the estimation accuracy of the channel response can be improved. In addition, since the channel response can be estimated by regarding the phase rotation performed on the band for mobile reception as a part of the phase fluctuation, the low image quality broadcasting data of the band for mobile reception can be decoded even if the phase rotation amount is not acquired from the transmission device 1. As a result, the low image quality broadcasting data can be decoded even if the phase rotation amount is unknown and thus, the received transmission signal can be demodulated even when the environment of a channel conveying the transmission signal between the transmission device 1 and the reception device 2 is poor.

The constellation demapper 205 demaps the low image quality broadcasting data cut out by the band cutout unit 203 according to a predetermined modulation scheme, and outputs the low quality broadcasting data to the error correction decoding unit 206. The error correction decoding unit 206 executes the error detection and correction processing on the low image quality broadcasting data output from the constellation demapper 205. In addition, the error correction decoding unit 206 (an example of a decoder) decodes the low image quality broadcasting data on the basis of the channel response estimated by the channel estimation unit 204.

As described above, the reception device 2 can decode the low image quality broadcasting data of the band for mobile reception without acquiring the phase rotation from the transmission device 1. Normally, in order to prevent erroneous notification of a phase rotation performed on the low image quality broadcasting data and to reduce the information amount of this phase rotation, the transmission device 1 often reduces the number of candidate phase rotation amounts of the phase rotation performed on the low image quality broadcasting data, such as {0,π}. However, the reception device 2 does not use the phase rotation when decoding the low image quality broadcasting data of the band for mobile reception.

Therefore, the transmission device 1 can set a greater number of candidate phase rotation amounts of the phase rotation performed on the low image quality broadcasting data of the band for the mobile reception than a candidate phase rotation amounts of the phase rotation performed on a PTS block not including the band for mobile reception (refer to FIG. 4). At that time, the transmission device 1 may set any one of discrete quantity and continuous quantity as the candidate phase rotation amount of the phase rotation performed on the low image quality broadcasting data of the band for mobile reception. Normally, the PAPR can be further reduced as the number of candidate phase rotation amounts of the phase rotation performed on the transmission signals in the frequency band of the OFDM subcarrier increases.

Figure 9:
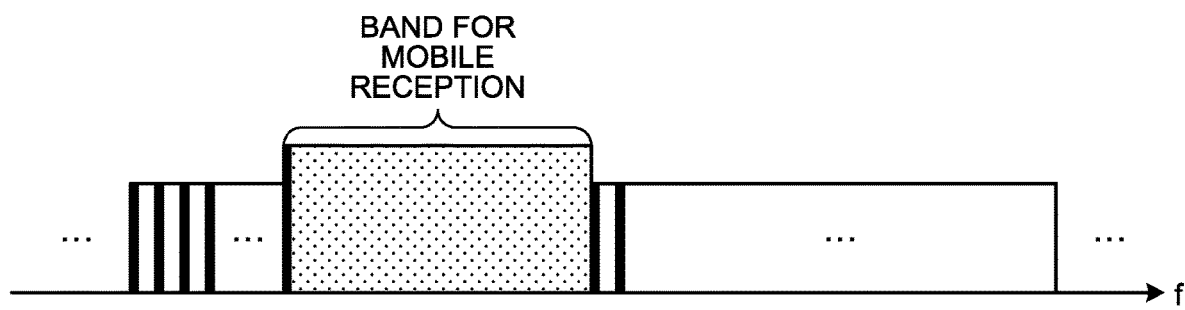
FIG. 9 is a diagram for explaining an example of boosting low image quality broadcasting data of a band for mobile reception in the transmission device according to the present embodiment.

FIG. 9 is a diagram for explaining an example of boosting the low image quality broadcasting data of the band for mobile reception in the transmission device according to the present embodiment. As illustrated in FIG. 9, in the present embodiment, the addition unit 107 of the transmission device 1 boosts the low image quality broadcasting data of the band for mobile reception more than a transmission signal of a band other than the band for mobile reception (band for fixed reception). As a result, the contribution degree of the PAPR of a PTS block including the band for mobile reception becomes higher than that of other PTS blocks. Therefore, by increasing the number of candidate phase rotation amounts of the phase rotation performed on the low image quality broadcasting data of the band for mobile reception, the reduction amount of the PAPR can be raised.

As described above, according to the transmission device 1 and the reception device 2 of the present embodiment, the low image quality broadcasting data can be decoded even if the phase rotation amount is unknown and thus, the received low image quality broadcasting data can be demodulated even when the environment of a channel conveying the low image quality broadcasting data between the transmission device 1 and the reception device 2 is poor.

Note that a program executed by the transmission device 1 and the reception device 2 according to the present embodiment is provided by being incorporated into a read only memory (ROM) or the like in advance. The program executed by the transmission device 1 and the reception device 2 according to the present embodiment may be configured so as to be provided by being recorded in a computer-readable recording medium, such as a CD-ROM, a flexible disk (FD), a CD-R, and a digital versatile disk (DVD), as a file in an installable format or in an executable format.

Furthermore, the program executed by the transmission device 1 and the reception device 2 according to the present embodiment may be configured so as to be saved and kept in a computer connected to a network such as the Internet and provided by being downloaded by way of the network. Alternatively, the program executed by the transmission device 1 and the reception device 2 according to the present embodiment may be configured so as to be provided or distributed by way of a network such as the Internet.

The program executed by the transmission device 1 according to the present embodiment has a module configuration including the above-described respective units (the error correction coding unit 101, the constellation mapper 102, the frequency allocation unit 103, the pilot insertion unit 104, the segment division unit 105, the partial waveform generation unit 106, the addition unit 107, the PAPR evaluation unit 108, the GI insertion unit 109, and the phase rotation pattern generation unit 110). As actual hardware, a central processing unit (CPU) reads a program from the above-mentioned ROM and executes the program, whereby the above-mentioned respective units are loaded on a main storage device such that the error correction coding unit 101, the constellation mapper 102, the frequency allocation unit 103, the pilot insertion unit 104, the segment division unit 105, the partial waveform generation unit 106, the addition unit 107, the PAPR evaluation unit 108, the GI insertion unit 109, and the phase rotation pattern generation unit 110 are generated on the main storage device.

In addition, the program executed by the reception device 2 according to the present embodiment has a module configuration including the above-described respective units (the GI deletion unit 201, the FFT unit 202, the band cutout unit 203, the channel estimation unit 204, the constellation demapper 205, and the error correction decoding unit 206). As actual hardware, a central processing unit (CPU) reads a program from the above-mentioned ROM and executes the program, whereby the above-mentioned respective units are loaded on a main storage device such that the GI deletion unit 201, the FFT unit 202, the band cutout unit 203, the channel estimation unit 204, the constellation demapper 205, and the error correction decoding unit 206 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission device comprising:
    an insertion unit that inserts a pilot symbol into a frequency band of a subcarrier of orthogonal frequency division multiplexing (OFDM) at intervals set in advance;
    an allocation unit that allocates, within the frequency band of the subcarrier, a predetermined band which is a part of this frequency band, modulated in accordance with a transmission signal to be transmitted to an external device set in advance, and has a pilot symbol at one end;
    a division unit that divides the frequency band of the subcarrier into a plurality of blocks;
    an IFFT unit that performs inverse fast Fourier transform on each of the blocks;
    a phase rotation unit that performs a phase rotation to reduce a peak-to-average power ratio (PAPR) characteristic for each of the blocks on which the inverse fast Fourier transform has been performed; and
    a transmission unit that combines the transmission signals, on each of which the phase rotation has been performed by the phase rotation unit, and transmits the combined transmission signal to the external device, wherein
    the division unit includes the predetermined band and at least one pilot symbol located outside of another end of the predetermined band on an opposite side of the one end into one block, and sets a greater number of candidate amounts of a phase rotation performed on a first block including the predetermined band among the blocks than candidate amounts of a phase rotation performed on a second block not including the predetermined band among the blocks.

2. The device according to claim 1, wherein the transmission unit boosts the transmission signal of the predetermined band.

3. A reception device comprising:
    a reception unit that receives a transmission signal of a band out of a frequency band of a subcarrier of orthogonal frequency division multiplexing (OFDM), the band including a predetermined band which is a part of this frequency band, in which a pilot symbol is inserted at one end, and which is included in a block in which a phase rotation is performed to reduce a PAPR characteristic, and including at least one pilot symbol located outside of another end of the predetermined band on an opposite side of the one end;
    an FFT unit that performs fast Fourier transform on the received transmission signal;
    an estimation unit that estimates a channel response for the predetermined band on the basis of the pilot symbol included in the transmission signal on which the fast Fourier transform has been performed; and
    a decoder that decodes the transmission signal using the estimated channel response, wherein
    candidate amounts of a phase rotation performed on a first block including the predetermined band among the blocks is greater than candidate amounts of a phase rotation performed on a second block not including the predetermined band among the blocks.

4. A transmission method comprising:
    inserting a pilot symbol into a frequency band of a subcarrier of orthogonal frequency division multiplexing (OFDM) at intervals set in advance;
    allocating, within the frequency band of the subcarrier, a predetermined band which is a part of this frequency band, modulated in accordance with a transmission signal to be transmitted to an external device set in advance, and has a pilot symbol at one end;
    dividing the frequency band of the subcarrier into a plurality of blocks;
    performing inverse fast Fourier transform on each of the blocks;
    performing a phase rotation to reduce a PAPR characteristic for each of the blocks on which the inverse fast Fourier transform has been performed;
    combining the transmission signals, on each of which the phase rotation has been performed, and transmitting the combined transmission signal to the external device;
    including the predetermined band and at least one pilot symbol located outside of another end of the predetermined band on an opposite side of the one end into one block; and setting a greater number of candidate amounts of a phase rotation performed on a first block including the predetermined band among the blocks than candidate amounts of a phase rotation performed on a second block not including the predetermined band among the blocks.

* * * * *